Aug. 25, 1942.                R. J. H. PLANIOL                2,293,918
                          CABLE FOR BARRAGE BALLOONS
                             Filed Dec. 6, 1940
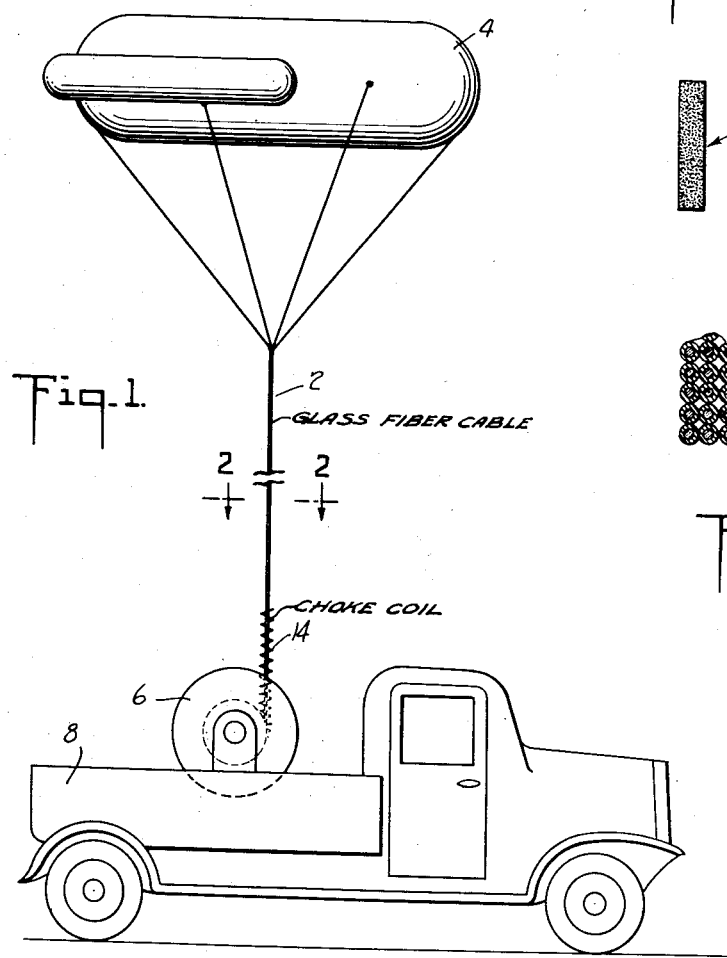
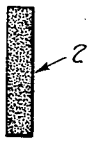
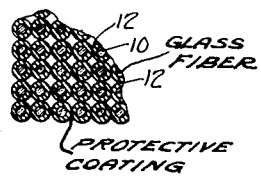
INVENTOR
Rene J. H. Planiol
BY
Bartlett, Eyre, Keel & Weymouth
ATTORNEYS Patented Aug. 25, 1942

2,293,918

UNITED STATES PATENT OFFICE 2,293,918

CABLE FOR BARRAGE BALLOONS

René J. H. Planiol, New York, N. Y.

Application December 6, 1940, Serial No. 368,934

9 Claims. (Cl. 174—131)

My present invention relates to cables for anchoring balloons, more particularly barrage balloons, to the ground, and comprises a novel cable for this purpose which will permit the balloons to ascend substantially further into the air and thus afford greater protection against enemy aircraft.

The height to which barrage balloons may go is limited primarily by the weight of the cable. With the steel cables now in use, the great weight of the steel prevents the balloons from rising high enough to intercept high flying bombing or pursuit planes. If, however, in accordance with the present invention, cables for such balloons are made of filaments or fibers of glass, the relatively less density of glass, as compared with steel, so reduces the weight of the cable as to permit the balloons to be flown at heights as high as, or even higher than, the heights at which bombing or pursuit planes can fly.

Because of the great tensile strength of glass, cables made therefrom will be at least as strong as the steel cables now in use, yet the weight will be substantially less. For example, the maximum tensile strength of steel wire is 460,000 lbs. per sq. in., whereas the tensile strength of glass fibers varies from 250,000 lbs. per sq. in. to 3,000,000 lbs. per sq. in., depending upon the cross-sectional area of the fibers; the tensile strength increasing rapidly with decrease in the cross-sectional area of the fiber. As the density of glass is less than one-third that of steel, it is apparent from the above that a cable of glass fibers of the same weight as that of steel and of the same tensile strength will be from one and a half to twenty times as long as the steel cable, depending upon the diameter of the filaments forming the glass cable.

One embodiment of the invention has been illustrated in the accompanying drawing of which:

Fig. 1 is a view showing a barrage balloon anchored by means of a cable constructed according to this invention;

Fig. 2 is an enlarged sectional view of the cable taken along the line 2—2 of Fig. 1; and Fig. 2a is a greatly magnified view of a portion of Fig. 2.

In Fig. 1 the new cable 2 of glass fibers is shown as anchoring the barrage balloon 4 to the winding drum 6, which drum may be conveniently carried by a truck or other vehicle 8.

Preferably, in forming the new cable 2, the glass fibers 10 of the cable as shown in Fig. 2a are individually coated to prevent friction between the fibers with consequent attrition and loss of strength. The coating 12 may be sprayed or otherwise applied to the fibers preferably before they are formed into the cable, as the coating also serves as a transverse bond between the individual filaments. Any suitable coating that will adhere to the glass fibers may be used. For example, a suitable coating may be obtained by dissolving a mixture of rubber, namely latex or synthetic rubber and casein in water; the casein forming from 10 to 20 per cent. of the mixture.

In the new cable, the individually coated fibers are preferably not twisted together but are kept parallel. This further reduces the possibility of friction between the separate filaments and permits the building up of a cable of rectangular cross section as shown in Fig. 2. A ribbon-like cable, that is, one with a rectangular cross section, is advantageous because it gives a better contact surface on the drum 6 upon which the cable is wound and unwound when the balloon is lowered and raised.

The individual parallel coated fibers of the preferred form of cable above described will in general be held together by the coating composition. I prefer, however, to wind helically about the cable a fine wire 14 of steel or copper or other electrically conducting material. This serves the double purpose of keeping the fibers together and of providing a choke coil able to stand very high potential without flashes and thus giving a safe discharge to the ground of static electricity on the balloon. Instead of the provision of such a helical conducting winding, a few fibers of glass can be wound helically about the cable to provide the additional means for keeping the fibers together, in which case chemical compounds of low conductivity, as for example, colloidal graphite are added to the coating to provide a path for the slow discharge to earth of the static electricity of the balloon.

Although superior results are obtainable with the preferred type of cable above described, the invention in its broadest aspects is directed to cables of glass fibers for barrage balloons, whether the fibers are twisted or parallel, and whether the cross section of the cable is circular or rectangular.

The following is claimed:

1. A barrage balloon anchoring cable constructed of a plurality of glass fibers each having a cross-sectional area such that the total weight of the cable is substantially less than that of a steel cable of equal tensile strength and equal length.

2. A barrage balloon anchoring cable constructed of a plurality of glass fibers each having a cross-sectional area such that the total weight of the cable is substantially less than that of a steel cable of equal tensile strength and equal length having a coating thereon to minimize friction therebetween.

3. A barrage balloon anchoring cable according to claim 2 wherein the glass fibers of the cable are untwisted and are arranged in parallel relation.

4. A barrage balloon anchoring cable comprising a plurality of parallel glass fibers, each having a coating thereon comprising a composition of casein in latex.

5. A barrage balloon anchoring cable constructed of parallel glass fibers and having incorporated therewith conductive means for permitting slow discharge to ground of static electricity.

6. A barrage balloon anchoring cable according to claim 5 wherein said conductive means comprises metallic conductors helically wound about the glass fibers to provide a choke coil.

7. A barrage balloon anchoring cable according to claim 5 wherein the glass fibers have a coating composition thereon to minimize internal friction and wherein said conductive means is incorporated within said coating composition.

8. A barrage balloon anchoring cable comprising a ribbon of individually coated parallel glass fibers.

9. A barrage balloon anchoring cable according to claim 8 including metallic conductors helically wound about said ribbon to provide a slow discharge to ground of static electricity.

RENÉ J. H. PLANIOL.